US012784598B2

(12) United States Patent
Yoshinaga et al.

(10) Patent No.: US 12,784,598 B2
(45) Date of Patent: Nov. 3, 2026

(54) VEHICLE

(71) Applicant: HONDA MOTOR CO., LTD., Tokyo (JP)

(72) Inventors: Masao Yoshinaga, Tokyo (JP); Chikashi Iizuka, Tokyo (JP); Keisuke Ohara, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 17 days.

(21) Appl. No.: 18/888,614

(22) Filed: Sep. 18, 2024

(65) Prior Publication Data

US 2025/0111780 A1 Apr. 3, 2025

(30) Foreign Application Priority Data

Sep. 29, 2023 (JP) ............................ JP2023-170924

(51) Int. Cl.
*G08G 1/16* (2006.01)
*B62J 50/21* (2020.01)

(52) U.S. Cl.
CPC ............... *G08G 1/167* (2013.01); *B62J 50/21* (2020.02)

(58) Field of Classification Search
CPC .. G08G 1/167; G08G 1/00; G08G 1/16; B62J 50/21; B62D 15/025; B62D 15/00; B62D 15/02; B62D 15/0255; B62D 15/026; B62D 15/0265; B62D 6/002; B62D 15/029; B62D 15/0295; B60W 50/14; B60W 30/12; B60W 2050/0054; B60W 2050/143; B60W 2420/403; B60W 2510/18; B60W 2540/12; B60W 2552/53; B60W 50/00; B60W 50/08; B60W 2050/146; B60W 50/16; B60W 10/20; B60W 2400/00; B60W 30/00; B60W 30/02; B60W 30/06; B60W 30/08; B60W 30/10; B60W 30/14; B60W 30/18; B60Q 1/44; B60Q 1/00; B60Q 1/26; B60Q 1/441; B60Q 1/442; B60Q 1/444; B60Q 1/445; B60Q 1/448; B60Q 9/008; G06K 9/00798; G06V 20/588; G06V 20/00; G06V 20/50; G06V 20/56; B60T 2201/08; B60T 2201/082; B60T 2201/083;

(Continued)

(56) References Cited

U.S. PATENT DOCUMENTS

| | | | | |
|---|---|---|---|---|
| 2019/0087668 A1* | 3/2019 | Kim | ........................ | G06V 20/58 |
| 2022/0204082 A1* | 6/2022 | Fukutomi | ................ | B62D 6/00 |
| 2022/0410908 A1* | 12/2022 | Molin | .................. | G06V 20/597 |

FOREIGN PATENT DOCUMENTS

| | | | | |
|---|---|---|---|---|
| DE | 102017202615 A1 * | 8/2018 | ............. | G08B 21/06 |
| DE | 102022200935 A1 * | 7/2023 | .............. | H04W 4/44 |

(Continued)

OTHER PUBLICATIONS

Japanese Office Action dated May 13, 2025 issued in corresponding Japanese application No. 2023-170924; English machine translation included (13 pages).

*Primary Examiner* — Brian A Zimmerman
*Assistant Examiner* — Anthony D Afrifa-Kyei
(74) *Attorney, Agent, or Firm* — Rankin, Hill & Clark LLP

(57) ABSTRACT

A vehicle that suppresses excessive warnings during travel in which lane departures occur repeatedly. If the time taken by the host vehicle from a previous lane-departure warning to a current lane departure is within a predetermined period of time, no warning is issued for the current lane departure.

2 Claims, 8 Drawing Sheets

(58) Field of Classification Search
CPC .. B60T 2201/089; G05D 1/0246; G05D 1/02; G05D 1/021; G05D 1/0231; G05D 1/0248; G05D 1/0251; G05D 1/0253; Y02T 10/84; B60R 1/00
See application file for complete search history.

(56) References Cited

FOREIGN PATENT DOCUMENTS

| | | | |
|---|---|---|---|
| JP | H3-144899 | A | 6/1991 |
| JP | H8-339500 | A | 12/1996 |
| JP | 2003-178397 | A | 6/2003 |
| JP | 2003-178400 | A | 6/2003 |
| JP | 2004-110394 | A | 4/2004 |
| JP | 2006-338200 | A | 12/2006 |
| JP | 2007-128427 | A | 5/2007 |
| JP | 2007-226666 | A | 9/2007 |
| JP | 2009-86839 | A | 4/2009 |
| JP | 2009-274497 | A | 11/2009 |
| JP | 4865096 | B1 | 2/2012 |
| JP | 2013-88894 | A | 5/2013 |
| JP | 5896505 | B2 | 3/2016 |
| JP | 2021-144331 | A | 9/2021 |

* cited by examiner

VEHICLE

INCORPORATION BY REFERENCE

The present application claims priority under 35 U.S.C. § 119 to Japanese Patent Application No. 2023-170924 filed on Sep. 29, 2023. The content of the application is incorporated herein by reference in its entirety.

TECHNICAL FIELD

The present invention relates to a vehicle.

BACKGROUND ART

Conventionally, as a driving assistance technology for vehicles, a technology that issues a warning when a vehicle departs from its lane, is known (for example, Patent Literature 1). In Patent Literature 1, in view of the fact that when there is another vehicle parked in the lane that a host vehicle is traveling in, or when road construction is being carried out, the host vehicle may have no choice but to depart from the lane, a technology has been proposed that shifts, to the oncoming lane, the position for determining whether or not to issue a warning when the lane that the host vehicle is traveling in is substantially narrowed due to obstacles or the like.

CITATION LIST

Patent Literature

[Patent Literature 1] Japanese Patent No. 5896505

SUMMARY OF INVENTION

Technical Problem

By the way, depending on the travel environment, temporary lane departures and immediate return may occur repeatedly, which may not necessarily require immediate warning.

The present invention has been made in view of the above-mentioned circumstances and an object of the present invention is to provide a vehicle with excessive warnings suppressed during travel in which lane departures occur repeatedly.

Solution to Problem

A vehicle according to a first aspect in which if the time taken by the host vehicle from a previous lane-departure warning to a current lane departure is within a predetermined period of time, no warning is issued for the current lane departure.

A vehicle according to a second aspect includes: a travel lane detector that detects a lane that the host vehicle is traveling in; a lane departure warning determination unit that, if conditions for issuing a lane departure warning are met with respect to the host vehicle, determines whether or not to issue the warning; and a warning unit that issues a warning on the basis of a determination result of the lane departure warning determination unit. If the conditions for issuing the lane departure warning are met again within a predetermined period of time after the conditions for issuing the lane departure warning are met, the warning unit issues no warning.

A vehicle according to a third aspect includes: a travel lane detector that detects a lane that the host vehicle is traveling in; a lane departure warning determination unit that determines whether or not conditions for issuing a lane departure warning are met with respect to the host vehicle; and a warning unit that issues a warning on the basis of a determination result of the lane departure warning determination unit. The conditions for issuing the lane departure warning are determined on the basis of at least whether or not a lane departure has occurred and whether or not the time elapsed between a previous lane-departure warning and a current lane departure exceeds a predetermined period of time.

Advantageous Effects of Invention

It is possible to provide a vehicle excessive warnings suppressed during travel in which lane departures occur repeatedly.

DESCRIPTION OF EMBODIMENTS

The following describes an embodiment of the present invention with reference to the drawings. Note that, in the description, descriptions on directions such as front and rear, right and left, and upper and lower are identical to directions with respect to a vehicle body insofar as descriptions are not particularly given. Reference sign FR illustrated in each drawing indicates a front side of the vehicle body, reference sign UP indicates an upper side of the vehicle body, and reference sign LH indicates a left side of the vehicle body.

First Embodiment

Figure 1:
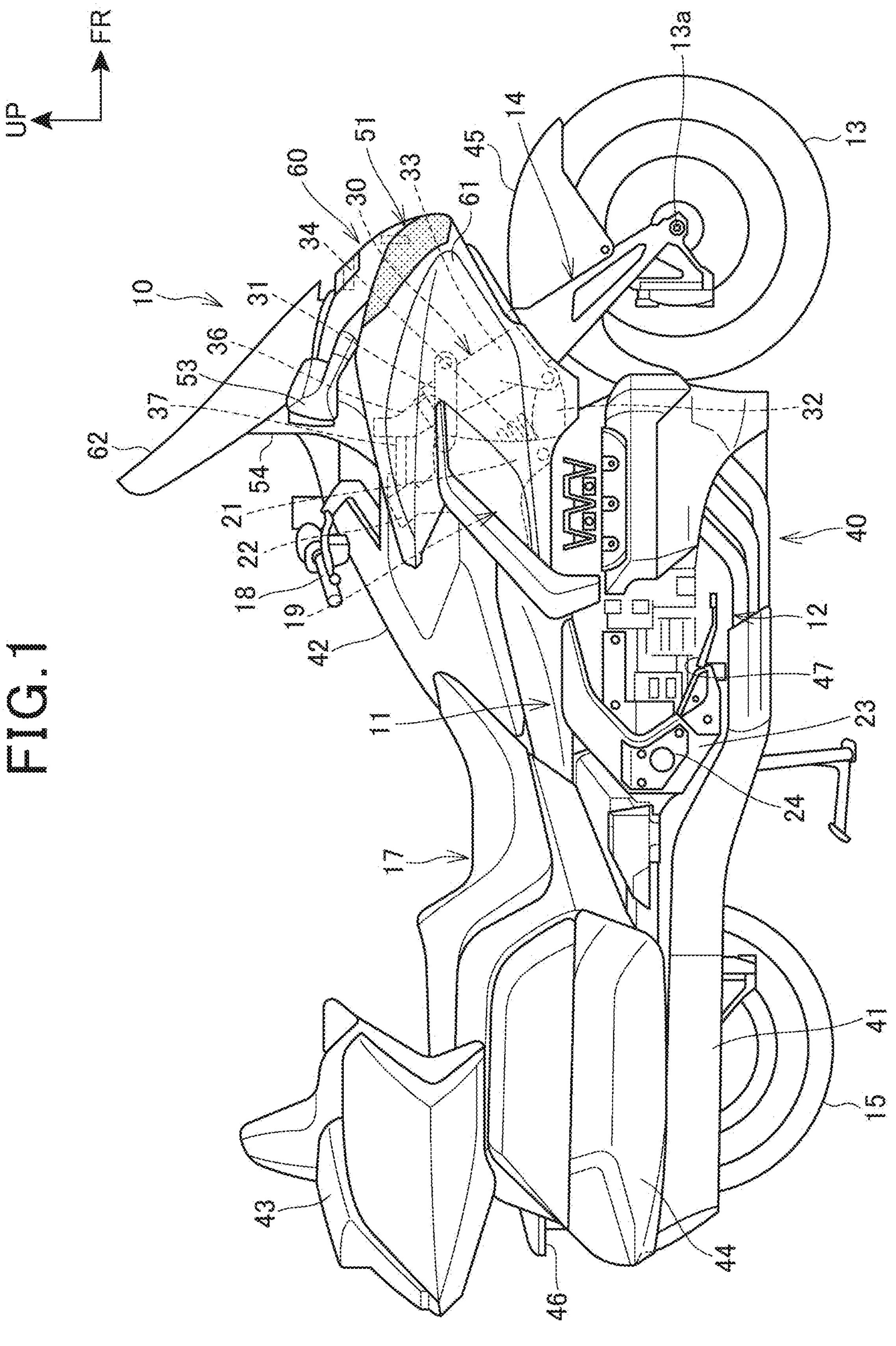
FIG. 1 is a right side view of a saddle riding vehicle according to a first embodiment.

FIG. 1 is a right side view of a saddle riding vehicle 10 according to a first embodiment.

The saddle riding vehicle 10 is a motorcycle including a body frame 11, a power unit 12 supported by the body frame 11, a front fork 14 that supports a front wheel 13 in a steerable manner, a rear swing arm (not illustrated) that supports a rear wheel 15, and a seat 17 for an occupant.

The saddle riding vehicle 10 is the vehicle on which the occupant straddles the seat 17 to ride. The seat 17 is disposed above a rear portion of the body frame 11.

The body frame 11 has a pair of left and right main frames 21 extending in the front-rear direction. A head pipe 22, which rotatably supports a steering shaft (not illustrated) rotated by a handlebar 18, is disposed at front ends of the main frames 21. A pair of left and right pivot plates 23 are disposed at rear ends of the main frames 21. Lower ends of the pivot plates 23 are connected to the front ends of the main frames 21 by a pair of left and right lower arms (not illustrated). A pair of left and right seat rails (not illustrated) extending rearward are disposed at the rear ends of the main frames 21.

A front suspension mechanism 30 that supports the front wheel 13 is placed at the front ends of the main frames 21. The front suspension mechanism 30 has an upper link 31 and a lower link 32 vertically spaced apart from each other at the front ends of the main frames 21. The upper link 31 and the lower link 32 have rear ends swingably coupled to the front ends of the main frames 21. The upper link 31 and the lower link 32 have front ends swingably coupled to a fork support body 33. The fork support body 33 has a tubular shape, and is inclined rearward.

A steering shaft 36 is supported by the fork support body 33 so as to be rotatable about the axis of the steering shaft 36. The steering shaft 36 has a shaft portion (not illustrated), which is inserted into the fork support body 33. A bridge (not illustrated) is disposed at a lower end of the steering shaft 36. The pair of left and right front forks 14 are supported by the bridge. The front wheel 13 is rotatably supported between the pair of left and right front forks 14 via an axle 13*a*. An upper end of the steering shaft 36 is coupled via a link 37 to a handlebar steering shaft (not illustrated) that is rotated by the handlebar 18. By steering the handlebar 18, the steering shaft 36 is rotated, and the front wheel 13 is steered.

A cushion unit 34 is placed between the main frames 21 and the lower link 32. The cushion unit 34 has a structure in which a shock absorber is inserted into a coil spring. The cushion unit 34 has an upper end swingably supported by the main frames 21. The cushion unit 34 has a lower end swingably supported by the lower link 32.

The upper link 31, the lower link 32, the fork support body 33, the cushion unit 34, and the pair of left and right front forks 14 constitute the front suspension mechanism 30 according to the present embodiment.

A front end of a rear swing arm (not illustrated) extending in the front-rear direction is swingably supported by the pivot plates 23. The rear swing arm is vertically swingable via a pivot shaft 24 that extends horizontally in the vehicle width direction. The rear wheel 15 is supported at a rear end of the rear swing arm.

The power unit 12 is supported by the main frames 21 and lower arms of the body frame 11. The power unit 12 is an internal combustion engine in the present embodiment. The power unit 12 includes a crankcase and a cylinder portion that houses a reciprocating piston. An exhaust device 40 is connected to the exhaust port of the cylinder portion. A muffler 41 of the exhaust device 40 is placed on the lower lateral side of the rear wheel 15 and extends in the front-rear direction.

An output from the power unit 12 is transmitted to the rear wheel 15 by a driving force transmitting member that connects the power unit 12 to the rear wheel 15.

A fuel tank 42 and an air cleaner box (not illustrated) are arranged above the main frames 21.

The seat 17 and a rear trunk 43 are supported by the seat rails.

Left and right saddlebags 44 are disposed below the rear trunk 43.

The saddle riding vehicle 10 includes a front fender 45 that covers the front wheel 13 from above, a rear fender 46 that covers the rear wheel 15 from above, and a step 47 on which the occupant places his/her foot.

The front fender 45 is attached to the front forks 14. The rear fender 46 and the step 47 are disposed below the seat 17.

Figure 2:
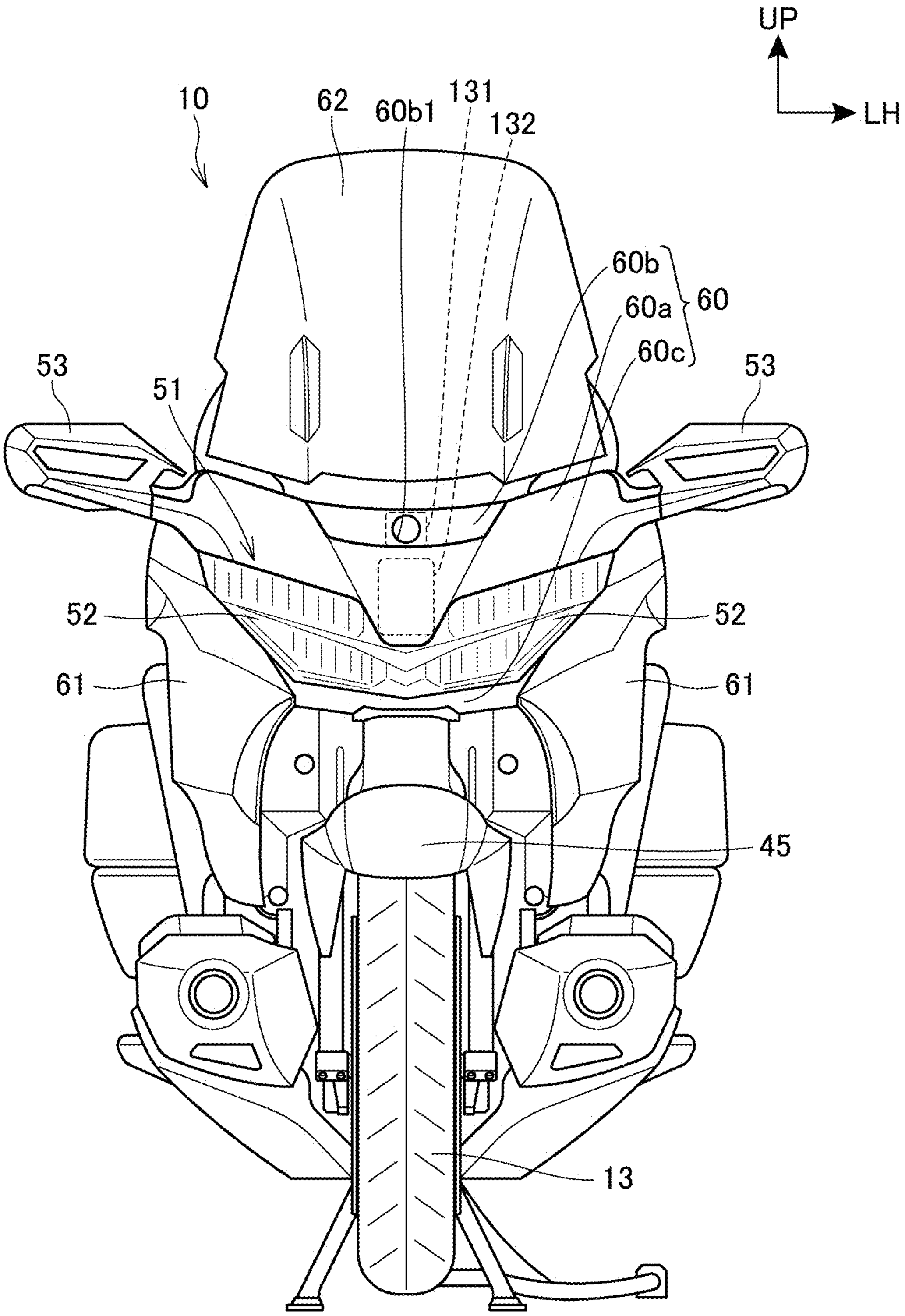
FIG. 2 is a front view of the saddle riding vehicle according to the first embodiment.

FIG. 2 is a front view of the saddle riding vehicle 10 according to the first embodiment.

A headlight unit 51 that emits light toward the front of the saddle riding vehicle 10 is placed in the front of the saddle riding vehicle 10. The headlight unit 51 according to the present embodiment is a twin-lens headlight unit. The headlight unit 51 includes a left-side light-emitting unit 52 and a right-side light-emitting unit 52 symmetrically. A pair of left and right side mirror units 53 are arranged at the outer rear upper sides of the headlight unit 51 in the left-right direction. The side mirror units 53 support side mirrors (not illustrated) for rearward visibility by the occupant.

The front portion of the saddle riding vehicle 10 is covered with a front cowl 60. The front side portions of the saddle riding vehicle 10 are covered with a pair of left and right side cowls 61. A screen 62 is placed above the front cowl 60. The screen 62 is a windshield that reduces the wind pressure to which the occupant is exposed during travel. The screen 62 is formed from, for example, a transparent resin member. A meter panel 54 including an electronic image display or the like that displays various information to the occupant is disposed behind the screen 62 and in front of the fuel tank 5.

In the present embodiment, the front cowl 60 is composed of cowl members 60*a*, 60*b*, and 60*c*, as illustrated in FIG. 2. The cowl member 60*a* extends in the left-right direction and constitutes the body of the front cowl 60. The cowl member 60*b* constitutes an upper portion of the cowl member 60*a*. The cowl member 60*c* is disposed in downwardly spaced relation to the cowl member 60*a*.

An opening that exposes the headlight unit 51 is formed between the cowl member 60*a* and the cowl member 60*c* and between the pair of left and right side cowls 61. The opening has an upper edge defined by the cowl member 60*a*. The opening has a lower edge defined by the cowl member 60*c*. The opening has left and right side edges defined by the side cowls 61.

Detection devices for detecting a situation in front of the saddle riding vehicle 10 are arranged behind the front cowl 60. In the present embodiment, the detection devices are an imaging unit 131 and a radar 132.

The imaging unit 131 includes an imaging element such as a CCD image sensor or a CMOS image sensor, and an optical system such as a lens. The imaging unit 131 captures an image of an area in front of the saddle riding vehicle 10. The imaging unit 131 is placed at the center of the front cowl 60 in the left-right direction when the vehicle is viewed from the front. The imaging unit 131 is placed behind the cowl member 60*b* that constitutes the upper portion of the front cowl 60. An opening 60*b*1 passing through the cowl member 60*b* is formed in the cowl member 60*b*. The imaging unit 131 captures an image of an area in front of the saddle riding vehicle 10 through the opening 60*b*1.

The radar 132 is, for example, a millimeter wave radar. The radar 132 is placed behind the cowl member 60*a*. The radar 132 is placed at the center of the front cowl 60 in the left-right direction when the vehicle is viewed from the front.

By arranging the imaging unit 131 and the radar 132 at the center of the saddle riding vehicle 10 in the left-right direction, a wider imaging range and detection range can be acquired to the left and right in front of the saddle riding vehicle 10. The situation in front of the saddle riding vehicle 10 can be detected more accurately.

The presence of the cowl member 60*a* can make the radar 132 inconspicuous when the saddle riding vehicle 10 is viewed from the front, and deterioration of the appearance of the saddle riding vehicle 10 can be avoided. The cowl member 60*a* is made of a material such as resin that can transmit electromagnetic waves.

Figure 3:
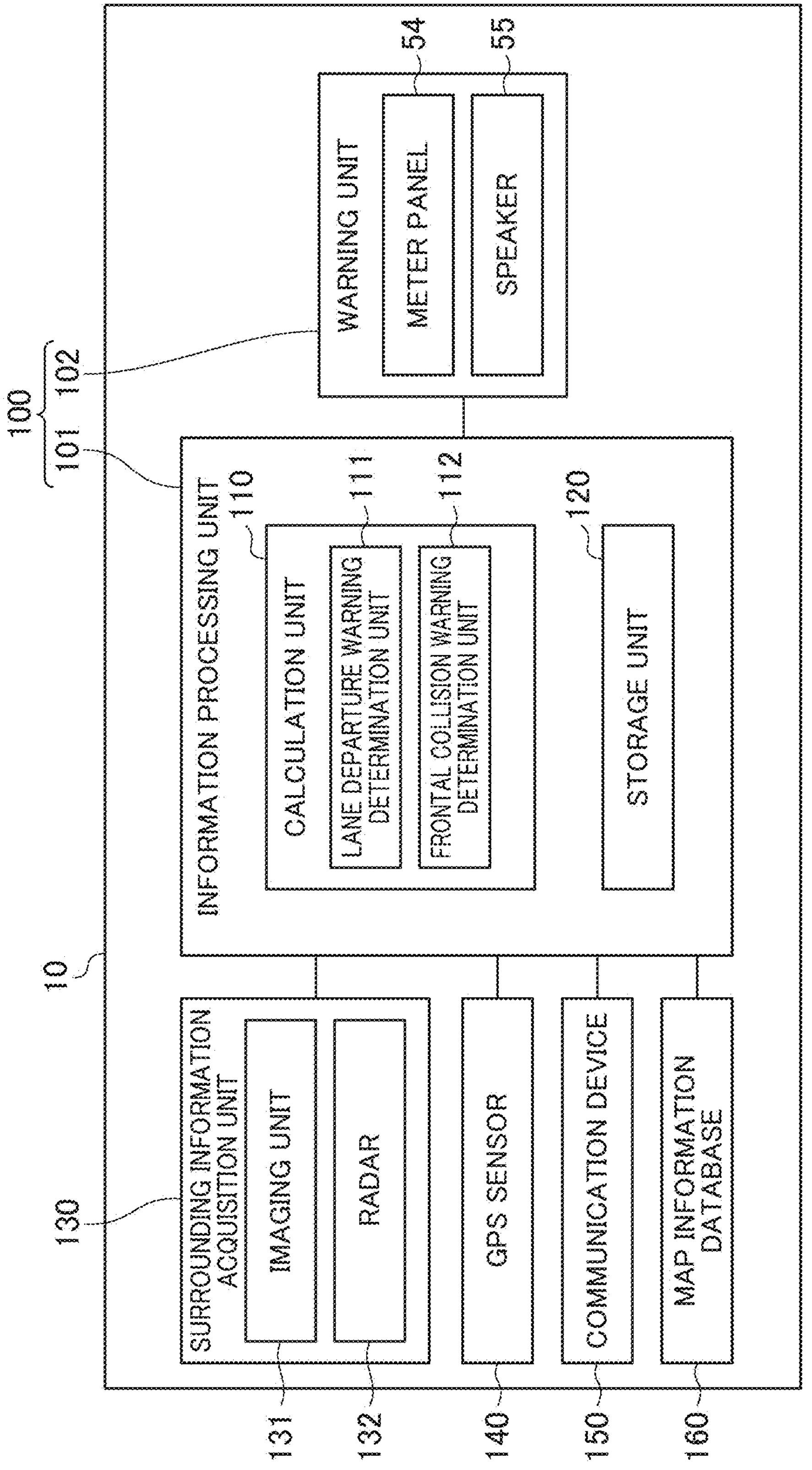
FIG. 3 is a block diagram illustrating an example of the schematic configuration of the saddle riding vehicle according to the first embodiment.

FIG. 3 is a block diagram illustrating an example of the schematic configuration of the saddle riding vehicle 10 according to the first embodiment.

The saddle riding vehicle 10 includes a travel assistance device 100, a surrounding information acquisition unit 130 that acquires surrounding information of the saddle riding vehicle 10, a GPS sensor 140, a communication device 150, and a map information database 160.

In the following description, when referring to the saddle riding vehicle 10 according to the present embodiment including the travel assistance device 100, the expression "host vehicle 10" will also be used.

The surrounding information acquisition unit (travel lane detector, forward obstacle detector) 130 includes a detection device that acquires information related to the surroundings of the host vehicle 10. The range that can be detected by the detection device includes at least the area in front of the host vehicle 10. The detection device is not limited to, but also is, for example, at least one of a radar, a light detection and ranging (LiDAR), an ultrasonic sensor, and an imaging unit. In the present embodiment, the surrounding information acquisition unit 130 includes the imaging unit 131 and the radar 132 as detection devices.

The surrounding information acquisition unit 130 constantly detects targets and road conditions around the host vehicle 10. The surrounding information acquisition unit 130 detects the lane that the host vehicle 10 is traveling in. The surrounding information acquisition unit 130 detects obstacles ahead of the host vehicle 10. On the basis of the detection results of the imaging unit 131 and the radar 132, it is possible to recognize the lane that the host vehicle 10 is traveling in, the presence and position of the other vehicle 200, obstacles ahead, and the like.

Processing for recognizing the presence of the other vehicle 200, the position of the other vehicle 200, and obstacles from the detection results of the sensor device of the surrounding information acquisition unit 130 may be performed by the surrounding information acquisition unit 130 or by the travel assistance device 100. For the processing, known processing can be applied as appropriate.

The global positioning system (GPS) sensor 140 detects the current position of the host vehicle 10. The GPS sensor 140 transmits the current position of the host vehicle 10 to the travel assistance device 100.

The communication device 150 communicates wirelessly with a server that provides map information and traffic information, and acquires this information. The communication device 150 transmits the acquired map information and traffic information to the travel assistance device 100.

A map information database DB can store highly accurate map information. On the basis of the map information and the like in the map information database DB, the travel assistance device 100 can identify the shape of the road that the host vehicle 10 is traveling on and the position of the host vehicle 10 on the lane with higher accuracy.

The travel assistance device 100 includes an information processing unit 101 that performs various information processing, and a warning unit 102 that performs warning processing for the rider (occupant) of the host vehicle 10.

The information processing unit 101 includes a calculation unit 110 and a storage unit 120. The calculation unit 110 is configured from a central processing unit (CPU) or a microcomputer. The storage unit 120 includes a memory such as a read only memory (ROM) or a random access memory (RAM). The calculation unit 110 functions as a lane departure warning determination unit 111 and a frontal collision warning determination unit 112 by executing the control program stored in the storage unit 120. The information processing unit 101 may be configured from a system-on-a-chip (SoC) that integrates the calculation unit 110 and the storage unit 120. The lane departure warning determination unit 111 and the frontal collision warning determination unit 112 are not limited to a configuration implemented by software, but may also be implemented by hardware.

The travel assistance device 100 according to the present embodiment acquires the detection results of the imaging unit 131 and the radar 132, and constantly recognizes targets and road conditions around the host vehicle 10. In addition, the travel assistance device 100 acquires information from the GPS sensor 140, the communication device 150, and the map information database DB.

The travel assistance device 100 issues a lane departure warning AL1 and a frontal collision warning AL2 with excessive warnings suppressed during travel in which lane departures occur repeatedly. Hereinafter, travel in which lane departures occur repeatedly will be referred to as "predetermined travel".

Figure 4:
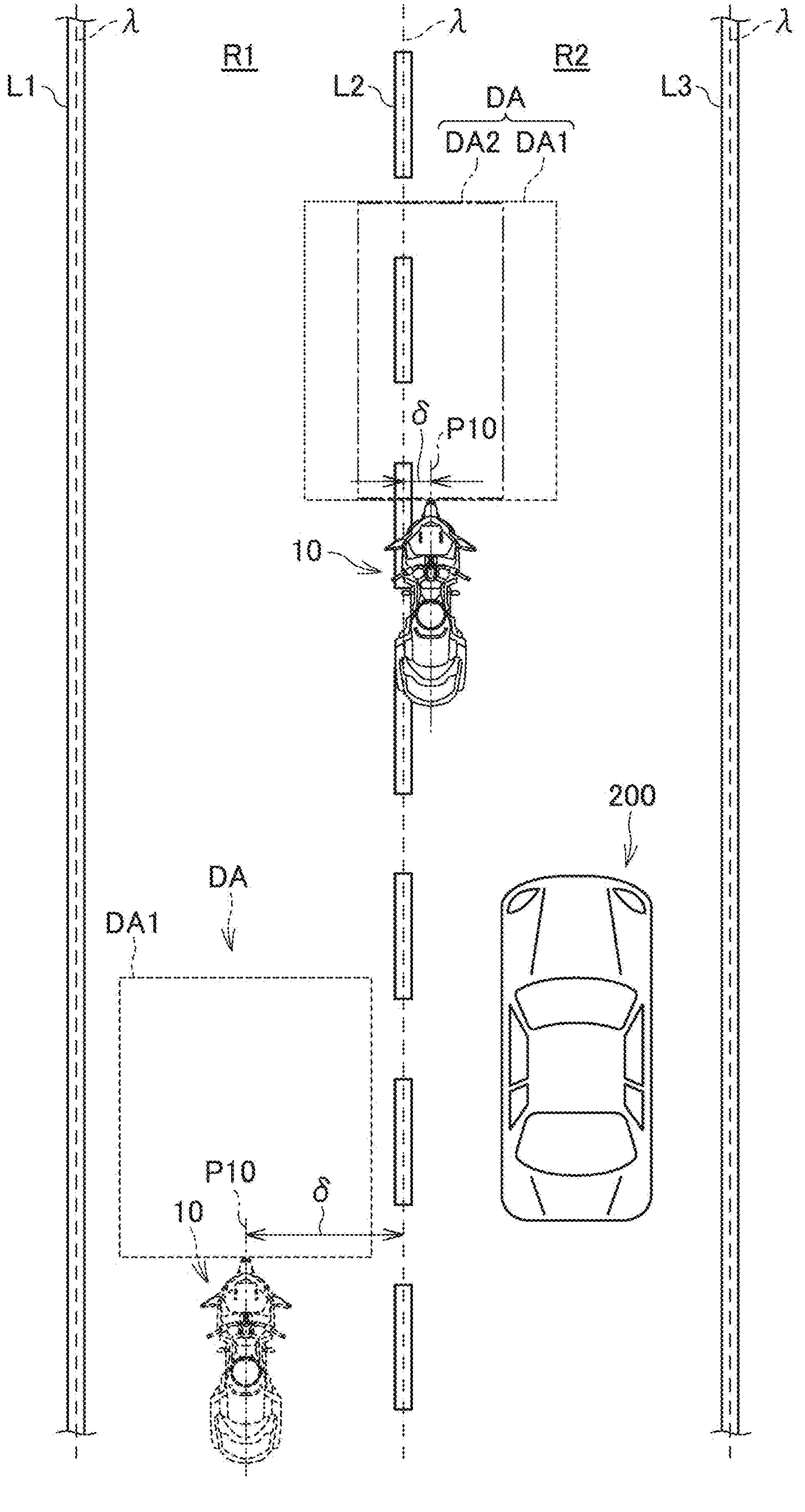
FIG. 4 is an explanatory diagram of a lane departure warning determination unit and a frontal collision warning determination unit according to the first embodiment.

FIG. 4 is an explanatory diagram of the lane departure warning determination unit 111 and the frontal collision warning determination unit 112 according to the first embodiment. FIG. 4 illustrates a road having two lanes in each direction, composed of a lane R1 and a lane R2. In FIG. 4, a lane boundary line L2 is drawn between the lane R1 and the lane R2. Lines L1 and L3 are drawn on the outside of the lane R1 and the lane R2 in the vehicle width direction.

The lane departure warning determination unit 111 determines whether or not to issue the lane departure warning AL1. The lane departure warning determination unit 111 according to the present embodiment determines whether to issue the lane departure warning AL1 so that the excessive issuance of the lane departure warning AL1 is suppressed during the predetermined travel. In the present embodiment, the lane departure warning determination unit 111 determines whether or not to issue the lane departure warning AL1 on the basis of whether or not the conditions for issuing the lane departure warning AL1for the host vehicle 10 are met and whether or not the conditions for issuing the lane departure warning AL1 are met repeatedly over a predetermined period. In the present specification, the term "lane departure" is used to mean that the host vehicle 10 is in a situation where the host vehicle 10 is likely to depart from its lane. Specifically, a case where a distance $\delta$ between a position P10 of the host vehicle 10 and a warning line $\lambda$ closer to the host vehicle 10 is less than a predetermined threshold value is said to be a lane departure.

Specifically, the lane departure warning determination unit 111 recognizes the lines L1 to L3 as the boundaries of the lanes R1 and R2 using the results of road condition detection by the surrounding information acquisition unit 130 and the map information in the map information database DB. The lane departure warning determination unit 111 sets a virtual warning line λ, which is a reference position for triggering the warning, on the basis of the lines L1 to L3. The lane departure warning determination unit 111 determines whether or not the conditions for issuing the lane departure warning AL1 are met on the basis of the position of the host vehicle 10 and the warning line λ. In other words, as illustrated in FIG. 4, the lane departure warning determination unit 111 determines whether or not the warning conditions are met, by determining whether or not the distance δ between the position P10 of the host vehicle 10 and the warning line λ closer to the host vehicle 10 is equal to or greater than the predetermined threshold value. The predetermined threshold value is set in advance through experimentation or the like.

Upon determining that the distance δ is equal to or greater than the predetermined threshold value, the lane departure warning determination unit 111 determines that the conditions for issuing the lane departure warning AL1 with respect to the host vehicle 10 are not met. Upon determining that the distance δ is not equal to or greater than the predetermined threshold value, that is, less than the predetermined threshold value, the lane departure warning determination unit 111 determines that the conditions for issuing the lane departure warning AL1are met with respect to the host vehicle 10. Note that in the present embodiment, it is determined as described above whether or not the warning conditions are met, but conventionally-known processing for the conditions for issuing the lane departure warning AL1can be applied to determine whether or not the conditions for issuing the lane departure warning AL1are met.

Upon determining that the conditions for issuing the lane departure warning AL1 are met, the lane departure warning determination unit 111 acquires the elapsed time since the previous time when the warning conditions were met. For example, the lane departure warning determination unit 111 acquires the elapsed time by calculating the difference between the previous time when the warning conditions were met and the current time. The lane departure warning determination unit 111 determines whether or not the elapsed time is equal to or longer than a predetermined period of time. In the present embodiment, the predetermined period of time is, for example, 3 seconds.

Upon determining that the elapsed time is equal to or longer than the predetermined period of time, the lane departure warning determination unit 111 determines to issue the lane departure warning AL1. Upon determining that the elapsed time is not equal to or longer than the predetermined period of time, the lane departure warning determination unit 111 determines not to issue the lane departure warning AL1.

In the present embodiment, if the elapsed time is not equal to or longer than the predetermined period of time, the lane departure warning determination unit 111 raises a suppression flag FL1 indicating that the lane departure warning AL1 is not issued and is being suppressed, and acquires the current time as the time when the warning conditions are met. Furthermore, upon determining that the elapsed time is equal to or longer than the predetermined period of time, the lane departure warning determination unit 111 lowers the suppression flag FL1.

The frontal collision warning determination unit 112 determines whether or not to issue the frontal collision warning AL2. The frontal collision warning determination unit 112 according to the present embodiment determines whether or not to issue the frontal collision warning AL2 so that the excessive issuance of the frontal collision warning AL2 is suppressed during the predetermined travel. In the present embodiment, the frontal collision warning determination unit 112 determines whether or not the conditions for issuing the frontal collision warning AL2 are met, on the basis of the detection results of the surrounding information acquisition unit 130 and a preset detection range DA. In other words, the frontal collision warning determination unit 112 determines whether or not the warning conditions are met, by determining whether or not there is an obstacle within the detection range DA.

Specifically, the frontal collision warning determination unit 112 acquires the detection results of the surrounding information acquisition unit 130. Further, the frontal collision warning determination unit 112 determines whether the suppression flag FL1 is raised. If the suppression flag FL1 is raised, the frontal collision warning determination unit 112 narrows the detection range DA in the width direction. The amount by which the detection range DA is narrowed in the width direction is the amount by which the other vehicles 200 do not excessively fall within the detection range DA during the predetermined travel. In other words, the amount of narrowing is such that the other vehicles 200 with no risk of collision do not fall within the detection range DA during the predetermined travel. The amount of narrowing may be calculated each time on the basis of the detection results of the surrounding information acquisition unit 130, and the traveling position and traveling direction of the host vehicle 10 detected by the GPS sensor 140 or the like. However, in the present embodiment, a fixed value that is preset on the basis of, for example, experiments is used. In other words, in the present embodiment, a preset normal detection range DA1, and a preset detection range DA2 for the predetermined travel condition, which is narrower in the vehicle width direction than the normal detection range DA1, are stored.

If the suppression flag FL1 is raised, the frontal collision warning determination unit 112 uses the detection range DA2 for the predetermined travel condition as the detection range DA. Thus, in the present embodiment, the detection range DA is narrowed in the width direction. If the suppression flag FL1 is not raised, the frontal collision warning determination unit 112 uses the normal detection range DA1 as the detection range DA.

The frontal collision warning determination unit 112 determines whether or not there is an obstacle within the detection range DA on the basis of the detection results of the surrounding information acquisition unit 130. Upon determining that there are obstacles such as the other vehicles 200, pedestrians, or falling objects within the detection range DA, the frontal collision warning determination unit 112 determines that the conditions for issuing the frontal collision warning AL2 are met, and determines to issue the frontal collision warning AL2. Upon determining that there are no obstacles within the detection range DA, the frontal collision warning determination unit 112 determines that the conditions for issuing the frontal collision warning AL2 are not met, and determines not to issue the frontal collision warning AL2.

The determination results of the lane departure warning determination unit 111 and the determination results of the frontal collision warning determination unit 112 are transmitted to the warning unit 102.

The warning unit 102 is a device that notifies the rider of the host vehicle 10 of the risk of lane departure or frontal collision. The warning unit 102 includes at least one of a display device or a voice output device disposed in the host vehicle 10. The warning unit 102 issues the lane departure warning AL1or the frontal collision warning AL2 at least by display or voice. The warning unit 102 according to the present embodiment includes the meter panel 54 and a speaker 55.

For example, the warning unit 102 issues the lane departure warning AL1or the frontal collision warning AL2 by displaying predetermined image information on the meter panel 54. Further, for example, the warning unit 102 issues the lane departure warning AL1or the frontal collision warning AL2 to the speaker 55 by means of a predetermined warning sound or voice output. Note that the warning unit 102 is not limited to the display device and the voice output device, but can also be configured to transmit information to a device carried by the rider via communication and inform the rider from that device. Any known notification device can be widely applied to the warning unit 102.

In the present embodiment, upon receiving a transmission indicating that the lane departure warning determination unit 111 has determined to issue the lane departure warning AL1, the warning unit 102 issues the lane departure warning AL1 in a preset manner. Furthermore, in the present embodiment, upon receiving a transmission indicating that the frontal collision warning determination unit 112 has determined to issue the frontal collision warning AL2, the warning unit 102 issues the frontal collision warning AL2 in a preset manner.

Figure 5:
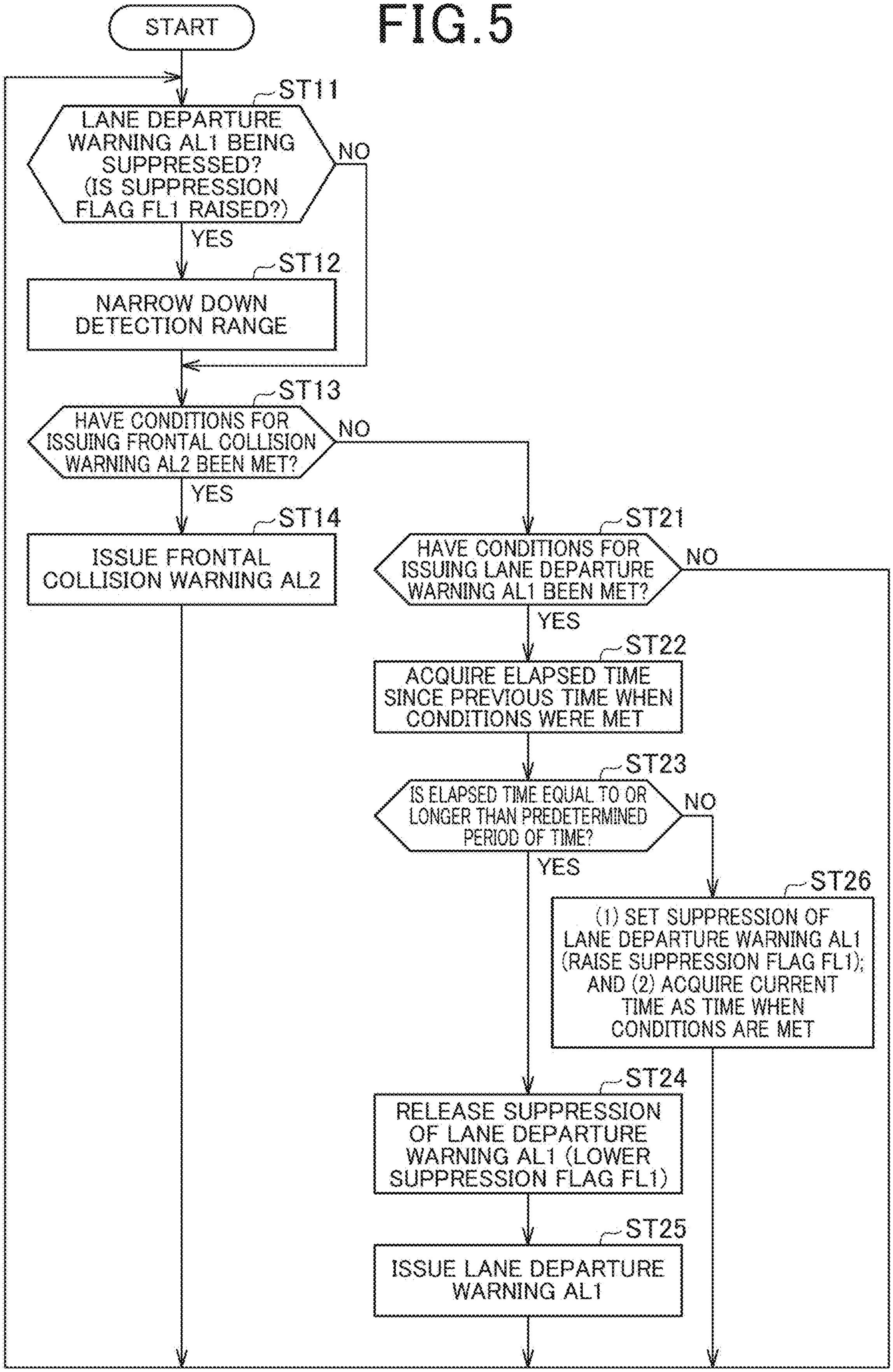
FIG. 5 is a flowchart illustrating an example of the operation of a travel assistance device according to the first embodiment.

FIG. 5 is a flowchart illustrating an example of the operation of the travel assistance device 100 according to the first embodiment. The operation illustrated in FIG. 5 is initiated, for example, when the ignition on or engine start (power unit start) of the host vehicle 10 is detected. At this time, the suppression flag FL1 is set to a lowered state as an initial value. Furthermore, for example, the current time is set as the time when the warning conditions are met.

In step ST11, the travel assistance device 100 uses the frontal collision warning determination unit 112 to determine whether or not the lane departure warning AL1 is being suppressed. Specifically, the travel assistance device 100 uses the frontal collision warning determination unit 112 to determine whether or not the suppression flag FL1 is raised. If the frontal collision warning determination unit 112 determines that the lane departure warning AL1 is being suppressed (step ST11; YES), the travel assistance device 100 advances the processing to step ST12.

If the frontal collision warning determination unit 112 determines that the lane departure warning AL1 is not being suppressed (step ST11; NO), the travel assistance device 100 advances the processing to step ST13.

In step ST12, the travel assistance device 100 sets the frontal collision warning determination unit 112 to narrow the detection range DA of the frontal collision warning AL2. In the present embodiment, the travel assistance device 100 uses the frontal collision warning determination unit 112 to set the detection range DA2 for the predetermined travel condition. The travel assistance device 100 then advances the processing to step ST13.

In step ST13, the travel assistance device 100 uses the frontal collision warning determination unit 112 to determine whether or not the conditions for issuing the frontal collision warning AL2 are met.

If the frontal collision warning determination unit 112 determines that the conditions for issuing the frontal collision warning AL2 are met (step ST13; YES), the travel assistance device 100 advances the processing to step ST14.

If the frontal collision warning determination unit 112 determines that the conditions for issuing the frontal collision warning AL2 are not met (step ST13; NO), the travel assistance device 100 advances the processing to step ST21.

In step ST14, the travel assistance device 100 causes the warning unit 102 to issue the frontal collision warning AL2. The travel assistance device 100 then returns the processing to step ST11.

In step ST21, the travel assistance device 100 uses the lane departure warning determination unit 111 to determine whether or not the conditions for issuing the lane departure warning AL1 are met.

If the lane departure warning determination unit 111 determines that the conditions for issuing the lane departure warning AL1 are met (step ST21; YES), the travel assistance device 100 advances the processing to step ST22.

If the lane departure warning determination unit 111 determines that the conditions for issuing the lane departure warning AL1 are not met (step ST21; NO), the travel assistance device 100 returns the processing to step ST11.

In step ST22, the travel assistance device 100 uses the lane departure warning determination unit 111 to acquire the previous time when the conditions for issuing the lane departure warning AL1 were met, and calculate the difference between the time when the warning conditions were met and the current time, thereby acquiring the elapsed time. The travel assistance device 100 then advances the processing to step ST23.

In step ST23, the travel assistance device 100 uses the lane departure warning determination unit 111 to determine whether or not the elapsed time is equal to or longer than the predetermined period of time.

If the lane departure warning determination unit 111 determines that the elapsed time is equal to or longer than the predetermined period of time (step ST23; YES), the travel assistance device 100 advances the processing to step ST24. If the lane departure warning determination unit 111 determines that the elapsed time is not equal to or longer than the predetermined period of time (step ST23; NO), the travel assistance device 100 advances the processing to step ST26.

In step ST24, the travel assistance device 100 uses the lane departure warning determination unit 111 to lower the suppression flag FL1 indicating that the lane departure warning AL1 is being suppressed. The travel assistance device 100 then advances the processing to step ST25.

In step ST25, the travel assistance device 100 issues the lane departure warning AL1 using the warning unit 102. The travel assistance device 100 then returns the processing to step ST11.

In step ST26, the travel assistance device 100 uses the lane departure warning determination unit 111 to raise the suppression flag FL1 to suppress the issuance of the lane departure warning AL1. Further, in step ST26, the travel assistance device 100 uses the lane departure warning determination unit 111 to acquire the current time as the time when the conditions for issuing the lane departure warning AL1 are met. The travel assistance device 100 then returns the processing to step ST11.

Figure 6:
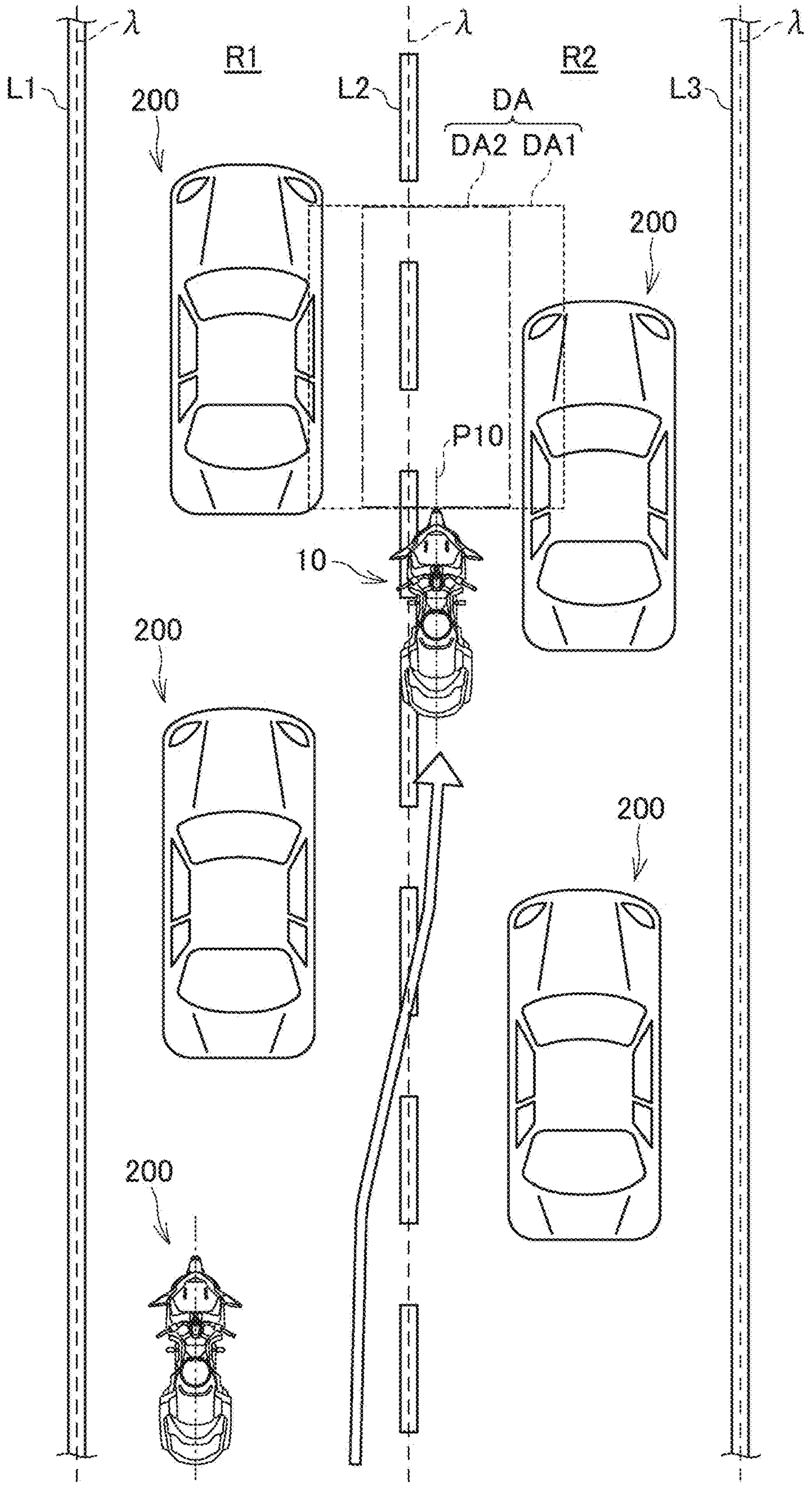
FIG. 6 is a functional explanatory diagram of the first embodiment.

FIG. 6 is a functional explanatory diagram of the first embodiment.

When the power unit 12 of the host vehicle 10 is started, the travel assistance device 100 is activated. In the travel assistance device 100, operation by the lane departure warning determination unit 111 and processing by the frontal collision warning determination unit 112 are initiated.

In the present embodiment, when the host vehicle 10 travels along the center of the lane R1 or R2 as illustrated by the dashed line in FIG. 4, the conditions for issuing the lane departure warning AL1 are not met because the host vehicle 10 is far enough away from the warning line λ. Therefore, the lane departure warning AL1 is not generated. Then the host vehicle 10 travels while determining whether or not the conditions for issuing the frontal collision warning AL2 are met on the basis of the presence or absence of an obstacle within the normal detection range DA1.

Meanwhile, if the host vehicle 10 travels close to an edge of the lane R1 or R2 and the distance δ between the warning line λ and the host vehicle 10 becomes close enough to be less than a predetermined threshold value, the conditions for issuing the lane departure warning AL1 are met. Therefore, the lane departure warning AL1 is issued. At this time, as illustrated in FIG. 6, if the travel condition is maintained along the edge of the lane R1 or R2 and the host vehicle 10 is in the state of the predetermined travel, the conditions for issuing the lane departure warning AL1 are still met after the elapse of the predetermined period of time. In the present embodiment, if the conditions for issuing the lane departure warning AL1are still met after the elapse of the predetermined period of time, the lane departure warning AL1 is not issued. Thus, it is possible to suppress excessive lane departure warnings AL1 during the predetermined travel.

In addition, the vehicle often passes between the other vehicles 200 on the left and right during the predetermined travel. Therefore, obstacles within the detection range DA are detected on the basis of the detection range DA2 for the predetermined travel condition, which is narrower in the vehicle width direction than the normal detection range DA1. As a result, if the host vehicle 10 is performing the predetermined travel, the detection of the other vehicles 200 with little risk of collision on either side is suppressed, which also suppresses the fulfillment of the conditions for issuing the frontal collision warning AL2 . Thus, it is possible to suppress excessive frontal collision warnings AL2 during the predetermined travel.

In general, the saddle riding vehicle 10 such as a motorcycle may perform the predetermined travel, such as traveling across multiple lanes. In the conventional lane departure warning processing, a lane departure warning is issued each time the warning conditions are met, which may cause the rider to lose trust in the warning or feel annoyed during the predetermined travel.

Besides, during the predetermined travel, excessive warnings may be issued even to vehicles diagonally ahead on the left and right, which are normally detected by the frontal collision warning, which may cause the rider to lose trust in the warnings or feel annoyed. In the present embodiment, upon observing behavior that is assumed to be the predetermined travel, the travel assistance device 100 is expected to suppress the excessive issuance of the lane departure warning AL1 and the frontal collision warning AL2, thereby reducing the rider's distrust of the warnings and suppressing the rider from feel annoyed and losing concentration during travel.

As described above, according to the first embodiment in which the present invention is applied, in the saddle riding vehicle 10, if the time taken by the host vehicle 10 from a previous lane departure warning to a current lane departure is within a predetermined period of time, no warning is issued for the current lane departure.

With this configuration, it is possible to provide a vehicle with excessive warnings suppressed during travel in which lane departures occur repeatedly.

In addition, according to the first embodiment in which the present invention is applied, the saddle riding vehicle 10 includes: the surrounding information acquisition unit 130 that detects the lane R1, R2 of the host vehicle 10; the lane departure warning determination unit 111 that, if the conditions for issuing the lane departure warning AL1 are met with respect to the host vehicle 10, determines whether or not to issue the warning; and the warning unit 102 that issues the warning on the basis of the determination result of the lane departure warning determination unit 111. If the conditions for issuing the lane departure warning AL1 are met again within a predetermined period of time after the conditions for issuing the lane departure warning AL1 are met, the warning unit 102 issues no warning.

With this configuration, if the vehicle crosses the lanes R1 and R2 in succession in a short period of time, no alarm is issued. Thus, it is possible to suppress excessive warnings when the vehicle is traveling in a manner that is considered to be the predetermined travel. Therefore, with this configuration, it is possible to provide a vehicle with excessive warnings suppressed during travel in which lane departures occur repeatedly, i.e., during the predetermined travel.

In the present embodiment, the saddle riding vehicle 10 includes the surrounding information acquisition unit 130 that detects an obstacle ahead of the host vehicle 10, and the frontal collision warning determination unit 112 that determines whether or not an obstacle is detected within the preset detection range DA, on the basis of the detection result of the surrounding information acquisition unit 130. If the conditions for issuing the lane departure warning AL1 are met again within the predetermined period of time after the conditions for issuing the lane departure warning AL1 are met, the length of the detection range DA in the vehicle width direction is shortened.

With this configuration, it is possible to suppress the excessive issuance of the lane departure warning AL1 while also suppressing the excessive issuance of the frontal collision warning AL2, during the predetermined travel.

Furthermore, in the present embodiment, if the frontal collision warning determination unit 112 determines not to issue a warning, the lane departure warning determination unit 111 determines whether or not to issue a warning.

With this configuration, occupant safety can be improved by giving priority to the frontal collision warning AL2 over the lane departure warning AL1.

Second Embodiment

A second embodiment to which the present invention is applied will be described. In the second embodiment, parts configured in the same manner as in the first embodiment are denoted by the same reference numerals, and description thereof will be omitted.

Figure 7:
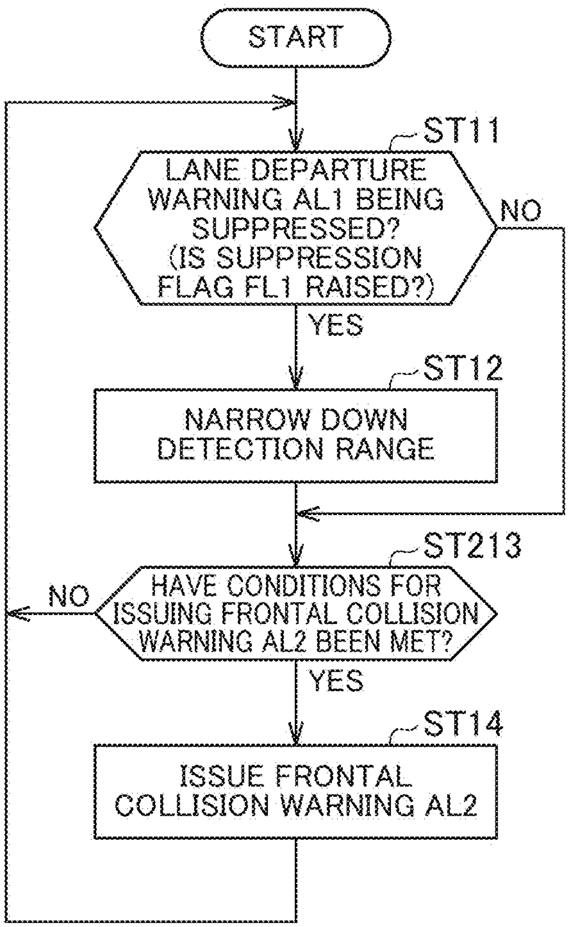
FIG. 7 is a flowchart illustrating the operation of the lane departure warning determination unit of a travel assistance device according to a second embodiment.
Figure 8:
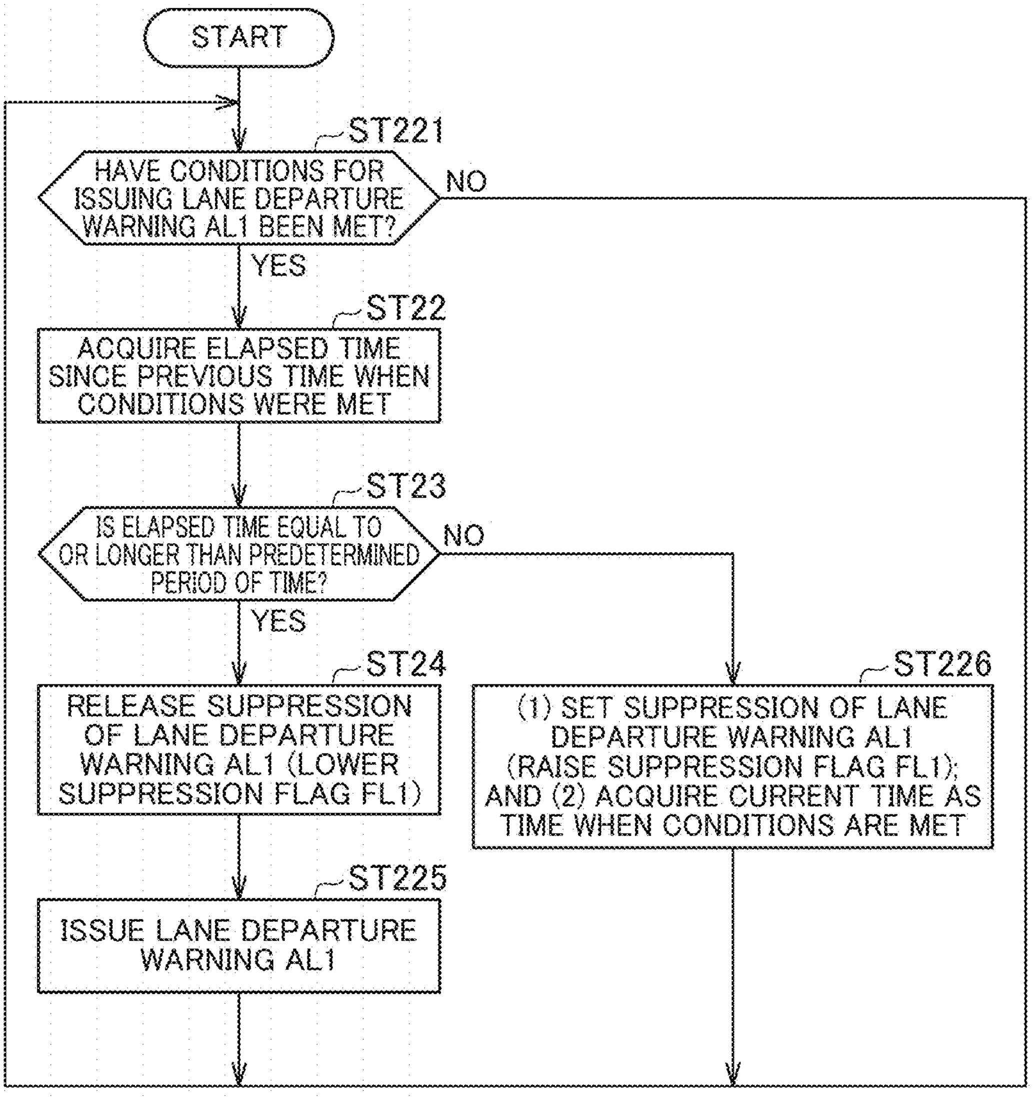
FIG. 8 is a flowchart illustrating the operation of the frontal collision warning determination unit of the travel assistance device according to the second embodiment.

FIG. 7 is a flowchart illustrating the operation of the lane departure warning determination unit 111 of the travel assistance device 100 according to the second embodiment. FIG. 8 is a flowchart illustrating the operation of the frontal collision warning determination unit 112 of the travel assistance device 100 according to the second embodiment.

In the first embodiment, the processing of the frontal collision warning determination unit 112 is executed with priority over the processing of the lane departure warning determination unit 111, but the second embodiment differs from the first embodiment in that the processing of the frontal collision warning determination unit 112 and the lane departure warning determination unit 111 are performed in parallel. In FIGS. 7 and 8, steps ST213, ST221, ST225, and ST226 are included instead of steps ST13, ST21, ST25, and ST26 of the first embodiment.

The operation illustrated in FIGS. 7 and 8 is initiated, for example, when the ignition on or engine start (power unit start) of the host vehicle 10 is detected. At this time, the suppression flag FL1 is set to the lowered state as an initial value. Furthermore, for example, the current time is set as the time when the warning conditions are met.

In step ST213 of FIG. 7, the travel assistance device 100 uses the frontal collision warning determination unit 112 to determine whether or not the conditions for issuing the frontal collision warning AL2 are met.

If the frontal collision warning determination unit 112 determines that the conditions for issuing the frontal collision warning AL2 are met (step ST213; YES), the travel assistance device 100 advances the processing to step ST15.

If the frontal collision warning determination unit 112 determines that the conditions for issuing the frontal collision warning AL2 are not met (step ST213; NO), the travel assistance device 100 returns the processing to step ST11.

In step ST221 of FIG. 8, the travel assistance device 100 uses the lane departure warning determination unit 111 to determine whether or not the conditions for issuing the lane departure warning AL1 are met.

If the lane departure warning determination unit 111 determines that the conditions for issuing the lane departure warning AL1 are met (step ST221; YES), the travel assistance device 100 advances the processing to step ST22.

If the lane departure warning determination unit 111 determines that the conditions for issuing the lane departure warning AL1 are not met (step ST221; NO), the travel assistance device 100 returns the processing to step ST221.

In step ST225, the travel assistance device 100 uses the warning unit to issue the lane departure warning AL1. The travel assistance device 100 then returns the processing to step ST221.

In step ST226, the travel assistance device 100 uses the lane departure warning determination unit 111 to raise the suppression flag FL1. Further, in step ST226, the travel assistance device 100 uses the lane departure warning determination unit 111 to acquire the current time as the time when the conditions for issuing the lane departure warning AL1 are met. The travel assistance device 100 then returns the processing to step ST221.

Also in the second embodiment, if the conditions for issuing the lane departure warning AL1are repeatedly met within a short period of time, the suppression flag FL1 is raised and the detection range DA is narrowed. Therefore, similarly to the first embodiment, the second embodiment can provide a saddle riding vehicle 10 with excessive warnings suppressed during the predetermined travel.

Other Embodiments

The embodiments described above show only an aspect of the present invention, and modifications and applications are possible optionally within a range not departing from the gist of the present invention.

In the embodiment described above, the configuration in which the lane departure warning AL1 and the frontal collision warning AL2 re issued by the same warning unit 102 has been exemplified, but dedicated warning units may be provided for each. This allows for different uses, such as changing the warning position, for example.

In the above embodiment, the configuration in which the surrounding information acquisition unit 130 corresponds to the travel lane detector and also corresponds to the forward obstacle detector has been exemplified. In other words, although the configuration in which the surrounding information acquisition unit 130 detects the lane that the host vehicle 10 is traveling in or obstacles ahead of the host vehicle 10 has been described, it is possible to provide separate surrounding information acquisition units specialized for each application for the travel lane detector and the forward obstacle detector.

In the second embodiment described above, the configuration in which the lane departure warning determination unit 111 and the frontal collision warning determination unit 112 are implemented by the single calculation unit 110 and storage unit 120 is exemplified, but the present invention is not limited to this. For example, the lane departure warning determination unit 111 and the frontal collision warning determination unit 112 may be implemented by separate calculation units and storage units. For example, one calculation unit and storage unit may implement the lane departure warning determination unit 111, and another calculation unit and storage unit capable of faster processing than the one calculation unit and storage unit may implement the function of the frontal collision warning determination unit 112. This also allows the frontal collision warning AL2 to have priority over the lane departure warning AL1.

In the first and second embodiments described above, the configuration is such that upon determining that the distance δ between the position P10 of the host vehicle 10 and the warning line λ closer to the host vehicle 10 is equal to or greater than the predetermined threshold value, the lane departure warning determination unit 111 determines that the conditions for issuing the lane departure warning AL1 are not met with respect to the host vehicle 10, and upon determining that the distance δ is not equal to or greater than the predetermined threshold value, that is, less than the predetermined threshold value, the lane departure warning determination unit 111 determines that the conditions for issuing the lane departure warning AL1 are met with respect to the host vehicle 10.

However, the lane departure warning determination unit 111 is not limited to the configurations of the first and second embodiments in determining whether or not the conditions for issuing the lane departure warning AL1 are met. For example, the lane departure warning determination unit 111 may determine whether or not the conditions for issuing the lane departure warning AL1 are met, on the basis of at least whether a lane departure has occurred and whether the time taken from the previous lane-departure warning to the current lane departure exceeds the predetermined period of time.

In other words, the conditions for issuing the lane departure warning AL1 may be based at least on whether or not a lane departure has occurred, and whether or not the time taken from the previous lane-departure warning to the current lane departure exceeds the predetermined period of time. In other words, the configuration may be such that if a lane departure has occurred and the time taken from the previous lane-departure warning to the current lane departure exceeds the predetermined period of time, the conditions for issuing the lane departure warning AL1 are met, and if no lane departure has occurred or the time taken from the previous lane-departure warning to the current lane departure does not exceed the predetermined period of time, the conditions for issuing the lane departure warning AL1 are not met.

Therefore, the vehicle includes the surrounding information acquisition unit 130 that detects the lane R1, R2 of the host vehicle 10, the lane departure warning determination unit 111 that determines whether or not the conditions for issuing the lane departure warning AL1 are met with respect to the host vehicle 10, and the warning unit 102 that issues a warning on the basis of the determination result of the lane departure warning determination unit 111. The conditions for issuing the lane departure warning AL1 may be determined on the basis of at least whether or not a lane departure has occurred and whether or not the time taken from the previous lane-departure warning to the current lane departure exceeds the predetermined period of time.

With this configuration, it is possible to provide a vehicle with excessive warnings suppressed during travel in which lane departures occur repeatedly.

In the above embodiments, the configuration in which the power unit 12 is an internal combustion engine has been exemplified, but the present invention can also be applied to electric vehicles in which the power unit is an electric motor.

In the above embodiment, the motorcycle having the front wheel 13 and rear wheel 15 has been described as an example of the saddle riding vehicle 10, but the present invention is not limited to this. The present invention can be applied to a three-wheel saddle riding vehicle having two front wheels or two rear wheels or a saddle riding vehicle having four or more wheels.

Configurations Supported by the Embodiments Described Above

The embodiments described above support following configurations.

(Configuration 1) A vehicle in which if a time taken by the host vehicle from a previous lane-departure warning to a current lane departure is within a predetermined period of time, no warning is issued for the current lane departure.

With this configuration, it is possible to provide a vehicle with excessive warnings suppressed during travel in which lane departures occur repeatedly.

(Configuration 2) A saddle riding vehicle including: a travel lane detector that detects a lane that the host vehicle is traveling in; a lane departure warning determination unit that, if conditions for issuing a lane departure warning are met with respect to the host vehicle, determines whether or not to issue the warning; and a warning unit that issues a warning on a basis of a determination result of the lane departure warning determination unit, in which if the conditions for issuing the lane departure warning are met again within a predetermined period of time after the conditions for issuing the lane departure warning are met, the warning unit issues no warning.

With this configuration, it is possible to provide a vehicle with excessive warnings suppressed during travel in which lane departures occur repeatedly.

(Configuration 3) The saddle riding vehicle according to Configuration 2 including: a forward obstacle detector that detects an obstacle ahead of the host vehicle; and a frontal collision warning determination unit that determines whether or not an obstacle is detected within a preset detection range, on the basis of a detection result of the forward obstacle detector, in which if the conditions for issuing the lane departure warning are met again within the predetermined period of time after the conditions for issuing the lane departure warning are met, a length of the detection range in a vehicle width direction is shortened.

With this configuration, it is possible to suppress the excessive issuance of the lane departure warning while also suppressing the excessive issuance of the frontal collision warning, during travel in which lane departures occur repeatedly.

(Configuration 4) The saddle riding vehicle according to Configuration 3, in which if the frontal collision warning determination unit determines not to issue a warning, the lane departure warning determination unit determines whether or not to issue a warning.

With this configuration, occupant safety can be improved by giving priority to the frontal collision warning over the lane departure warning.

(Configuration 4) The saddle riding vehicle according to Configuration 2, in which if the frontal collision warning determination unit determines not to issue a warning, the lane departure warning determination unit determines whether or not to issue a warning.

With this configuration, occupant safety can be improved by giving priority to the frontal collision warning over the lane departure warning.

(Configuration 5) A vehicle including: a travel lane detector that detects a lane that the host vehicle is traveling in; a lane departure warning determination unit that determines whether or not conditions for issuing a lane departure warning are met with respect to the host vehicle; and a warning unit that issues a warning on a basis of a determination result of the lane departure warning determination unit, in which the conditions for issuing the lane departure warning are determined on the basis of at least whether or not a lane departure has occurred and whether or not a time elapsed between a previous lane-departure warning and a current lane departure exceeds a predetermined period of time.

With this configuration, it is possible to provide a vehicle with excessive warnings suppressed during travel in which lane departures occur repeatedly.

REFERENCE SIGNS LIST

10: host vehicle (saddle riding vehicle)
102: warning unit
111: lane departure warning determination unit
112: frontal collision warning determination unit
130: surrounding information acquisition unit (travel lane detector, forward obstacle detector)
AL1: lane departure warning
DA: detection range
R1: lane (travel lane)
R2: lane (travel lane)

The invention claimed is:

1. A saddle riding vehicle comprising:

a travel lane detector that detects a lane that the saddle riding vehicle is traveling in;

a lane departure warning determination unit that, if conditions for issuing a lane departure warning are met with respect to the saddle riding vehicle, determines whether or not to issue a warning;

a warning unit that issues a warning on a basis of a determination result of the lane departure warning determination unit;

a forward obstacle detector that detects an obstacle ahead of the saddle riding vehicle; and a frontal collision warning determination unit that determines whether or not the obstacle is detected within a preset detection range, on the basis of a detection result of the forward obstacle detector, wherein if the conditions for issuing the lane departure warning are met again within a predetermined period of time after the conditions for issuing the lane departure warning are met, the frontal collision warning determination unit shortens a length of the detection range in a vehicle width direction of the saddle riding vehicle, and determines whether or not the obstacle is detected within the detection range shortened, and if the conditions for issuing the lane departure warning are met again within the predetermined period of time after the conditions for issuing the lane departure warning are met, the warning unit issues no warning.

2. The vehicle according to claim 1, wherein if the frontal collision warning determination unit determines not to issue the warning, the lane departure warning determination unit determines whether or not to issue the warning.

* * * * *